United States Patent [19]

Long

[11] 4,295,451

[45] Oct. 20, 1981

[54] CLOSED LOOP FUEL CONTROL FOR INTERNAL COMBUSTION ENGINE

[75] Inventor: E. David Long, Elmira, N.Y.

[73] Assignee: Allied Chemical Corporation, Morris Township, Morris County, N.J.

[21] Appl. No.: 135,820

[22] Filed: Mar. 31, 1980

Related U.S. Application Data

[63] Continuation of Ser. No. 929,156, Jul. 31, 1978, abandoned.

[51] Int. Cl.³ .............................................. F02M 7/00
[52] U.S. Cl. .................................. 123/438; 123/437; 123/445; 123/446
[58] Field of Search ............... 123/437, 438, 445, 446; 60/276, 285

[56] References Cited

U.S. PATENT DOCUMENTS

| | | | |
|---|---|---|---|
| 3,745,768 | 7/1973 | Zechnall et al. | 60/285 |
| 3,827,237 | 8/1974 | Linder et al. | 123/32 EE |
| 3,990,411 | 11/1976 | Oberstadt et al. | 123/32 EA |

OTHER PUBLICATIONS

Ogada, "Modern Control Engineering", Prentice-Hall, pp. 156-159.

*Primary Examiner*—Charles J. Myhre
*Assistant Examiner*—R. A. Nelli
*Attorney, Agent, or Firm*—Roger H. Criss; Joel I. Rosenblatt

[57] ABSTRACT

An electronic fuel injection system is provided with a closed loop control having a plurality of loops for proportioning a mixture of air and fuel delivered to an internal combustion engine. The system has a sensor for providing an electrical signal, the magnitude of which varies in proportion to the concentration of a constituent of exhaust gas from the engine. A first of the loops compensates for small amplitude, short term disturbances of said signal. The second loop compensates for large amplitude, long term signal disturbances. Signals from the first and second loops are combined to produce a composite signal that maintains precise control over the average air/fuel ratio while generating rapid small amplitude fluctuations in that air/fuel ratio which shortens the response time of the system and increases its ability to reduce exhaust gas pollutants.

4 Claims, 9 Drawing Figures

CLOSED LOOP FUEL CONTROL FOR INTERNAL COMBUSTION ENGINE

This is a continuation of application Ser. No. 929,156, filed July 31, 1978 now abandoned.

BACKGROUND OF THE INVENTION

1. Field of the Invention

This invention relates to fuel injection systems for vehicle engines and more particularly to a closed loop system for reducing noxious components in exhaust emitted from the engine.

2. Description of the Prior Art

During the last ten years or so, it has become necessary to design internal combustion engines emitting low levels of the pollutants carbon monoxide, hydrocarbons, and oxides of nitrogen. Many of the techniques devised for this purpose are successful only if very accurate control is maintained over the air/fuel ratio (A/F) of the mixture entering the combustion cylinders. The air/fuel ratio should be controlled to within about one percent to enable the three way catalyst that is generally employed in such systems to function effectively.

One of the most promising methods for obtaining close control of A/F is based on a device sensing oxygen content of the exhaust gas. The output signal of such a device is a strong function of the air/fuel ratio, especially when such air/fuel ratio approaches stoichiometry. By using the output signal of the oxygen sensor to make appropriate corrections in the fuel flow rate, a closed loop control system is achieved.

In principle, closed loop systems are self-correcting, highly accurate, and never require recalibration. In practice, however, closed loop control systems are subject to the occurrence of instabilities, leading to large amplitude fluctuations and loss of control. One of the possible causes for such instabilities is the existence of a transportation delay or "dead time" somewhere in the controlled system. This transportation delay consists of the time interval between formation of the mixture, and arrival of the burnt mixture at the exhaust oxygen sensor.

Closed loop systems have heretofore endeavored to eliminate transportation delay instability by reducing the total gain of the loop. The loop gain reduction is preferably set so that the time for response to a disturbance is about equal to the dead time. The latter is not constant, but varies with engine speed. Hence, the loop gain must be long enough to permit the system to remain stable under engine idle conditions, wherein dead time is longest. Adjusting loop gain so that the time for response to a disturbance is substantially the same as dead time under idle conditions produces a response time that is too long for optimum air/fuel ratio control at higher engine speeds.

SUMMARY OF THE INVENTION

The present invention provides a closed loop fuel injection system for proportioning a mixture of air and fuel delivered to an internal combustion engine. Generally stated, the system has a sensor means for providing an electrical signal, the magnitude of which varies in proportion to the concentration of a constituent of exhaust gas from the engine. A first loop means responsive to said electrical signal compensates for small amplitude, short term disturbances (such as short term drifts). The first loop means has a high gain, low stability and restricted authority over the electrical signal, and is operative to provide a first loop signal with an amplitude limited to a small value. A second loop means responsive to the electrical signal compensates for large amplitude, long term disturbances (such as long term drifts). The second loop means has a low gain, high stability and large authority over the electrical signal, and is operative to provide a second loop signal with a large amplitude. The first loop means has a response time that varies directly with and is sunstantially the same as the time interval between formation and detection of the air/fuel mixture. The second loop means has a response time longer than the response time of the first loop means and is adapted to at least partially correct large amplitude disturbances. Any remaining part of the large amplitude disturbances not corrected by the second loop means is corrected by the first loop means. A combining means is provided for combining the first and second loop signals to produce a composite pulse of variable width. The composite pulse is applied to an injector of the internal combustion engine to fix the proportion of air and fuel contained by the mixture.

BRIEF DESCRIPTION OF THE DRAWINGS

The invention will be more fully understood and its advantages will become apparent when reference is made to the following detailed description of the preferred embodiments and the accompanying drawings in which.

DESCRIPTION OF THE PREFERRED EMBODIMENTS

Figure 1:
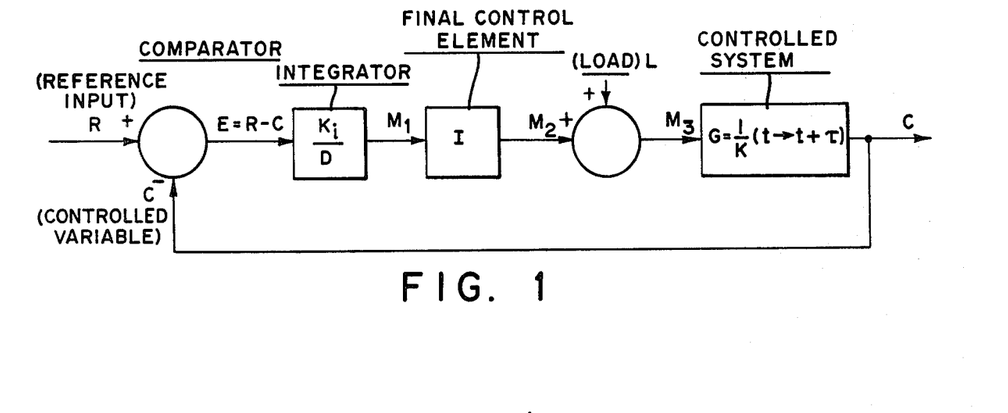
FIG. 1 is a block diagram of a control system for a fuel injected internal combustion engine.

Referring to FIG. 1 of the drawings, there is shown a controlled system having an output signal C that appears as dead time $\tau$ after application of the input signal $M_3$. Except for this dead time or transportation delay, the output signal is proportional to the input signal:

$$C(t+\tau)=M_3(t)/K \qquad (1)$$

The controller incorporates a reference input R, and integrator with gain $K_i$ acting on the error signal $E=R-C$, and appropriate final control elements. Allowance is made for the possibility of a load L acting on the controlled system. The gain of the final control elements can be set equal to unity without loss of generality, by including the actual value of this gain in the value used for $K_i$. Next to equation (1), the system is governed by the equations:

$$M_3(t) = M_2(t) + L(t) \tag{2}$$

$$M_2(t) = M_1(t) - K_i \int^t (R - C)dt. \tag{3}$$

Combining equations (1), (2) and (3) yields a differential equation (4) describing the behavior of the system:

$$K \frac{d}{dt} C(t + \tau) + K_i C(t) = K_i R(t) + \frac{d}{dt} L(t) \tag{4}$$

The dead time $\tau$ is considered to be a given parameter, which varies slowly with time. The parameter K is given and constant, while $K_i$ can be varied. The solution of equation (4) can be obtained using the method of Laplace transforms. Assuming that $C(t)=0$ for $t<\tau$, it is found that $$[s \exp(s\tau)K + K_i]\bar{C} = K_i\bar{R} + s\bar{L}, \tag{5}$$

where the bar indicates a Laplace transformed quantity:

$$\bar{C} \equiv \bar{C}(s) = \int_0^\infty \exp(-st)dt.$$

Figure 2:
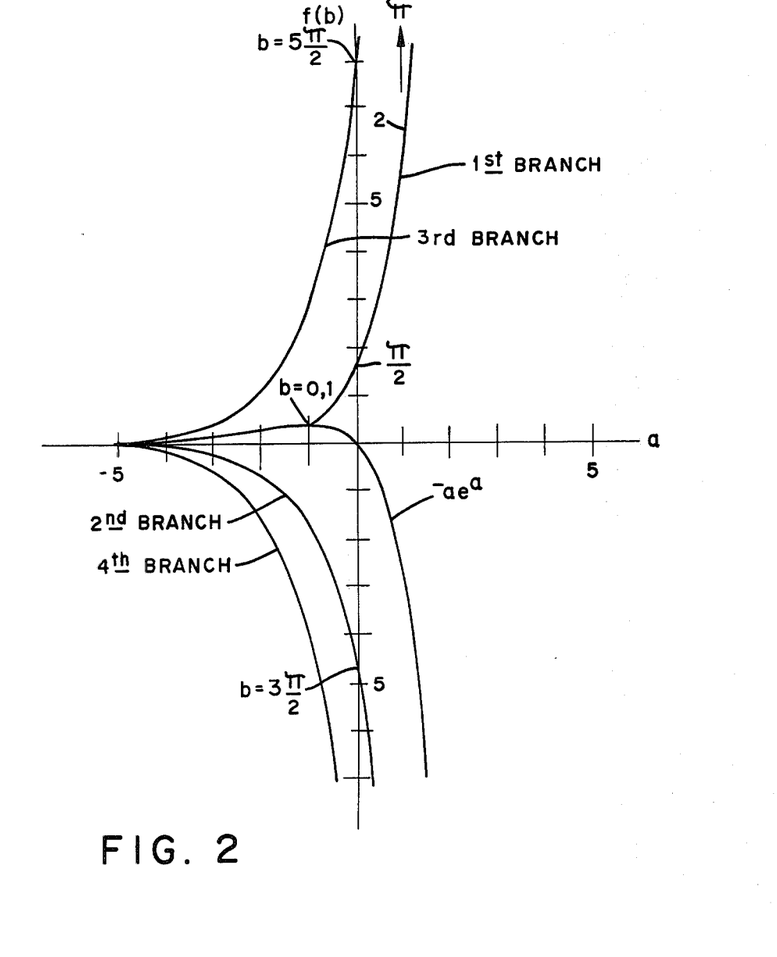
FIG. 2 is a graph illustrating the relationship between functions $-a \exp(a)$ and $f(b)=(b/\sin b) \exp(-b/\tan b)$ where $a=-b/\tan b$, as function of a, which functions are produced by operation of the system of FIG. 1 and result in instabilities whenever $a>o$.

The solution of (5) is $$\bar{C} = \frac{K_i\bar{R} + s\bar{L}}{s \exp(s\tau)K + K_i} = \frac{k\bar{R} + p\bar{L}/K}{p \exp(p) + k} \tag{6}$$

where $p = s\tau$ and $k = K_i \tau/K$. Setting $p = a + jb$, it is found that the roots of the denominator of (6) are given by (i) $b=0$, $-a \exp(a) = k$ (ii) $f(b)=(b/\sin b) \exp(-b/\tan b) = k$, $a = -b/\tan b$. Because $k>0$, and because the maximum of the function $-a \exp(a)$ is $\exp(-1)$ (see FIG. 2), solutions (i) exist for $0 < k < \exp(-1)$. For every value of k in this range, there are two such solutions. The corresponding values of a, $a_1$ and $a_2$, say, can be found from FIG. 2 by drawing the horizontal line k=constant. These solutions yield exponentially decaying functions for C:

$$\bar{C}_i = \frac{k\bar{R}(a_i/\tau) + a_i\bar{L}(a_i/\tau)/K}{\tau(l + a_i)} \exp[-|a_i|(t - \tau)/\tau], i = 1,2$$

As $\tau \to 0$, it is found that $k \to 0$, $a_1 \to o$ and $a_2 \to -\infty$, so that $C_2 \to 0$, and $$C_1 \longrightarrow$$

$$\left[ \frac{K_i}{K} \bar{R}\left(-\frac{K_i}{K}\right) - \frac{K_i}{K^2} \bar{L}\left(-\frac{K_i}{K}\right) \right] \exp\left(-\frac{K_i t}{K}\right)$$

The latter solution corresponds to a situation in which there is no transportation delay.

Figure 3:
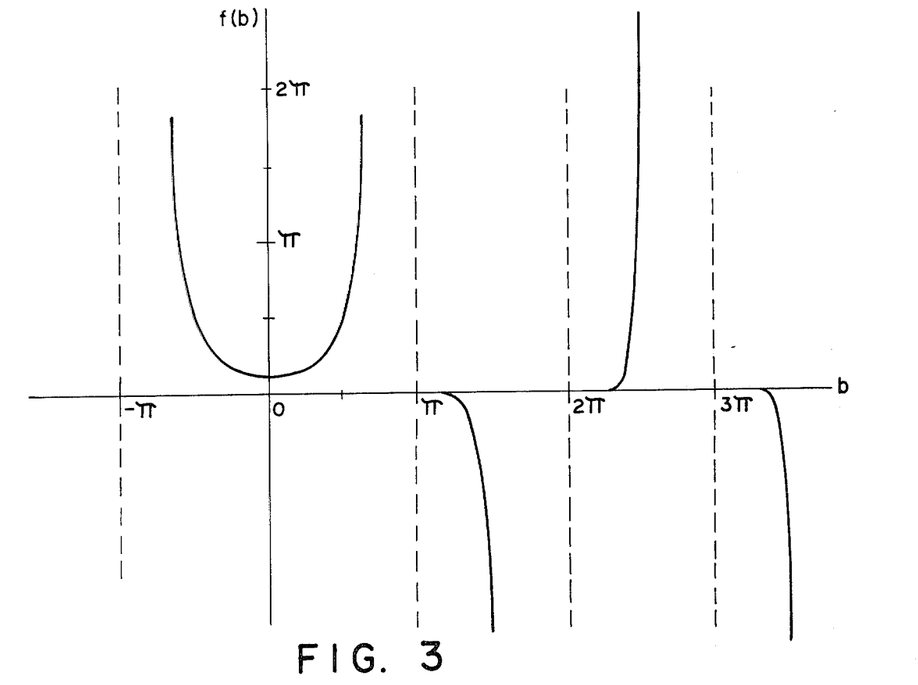
FIG. 3 is a graph showing the function f(b) as a function of b.
Figure 4:
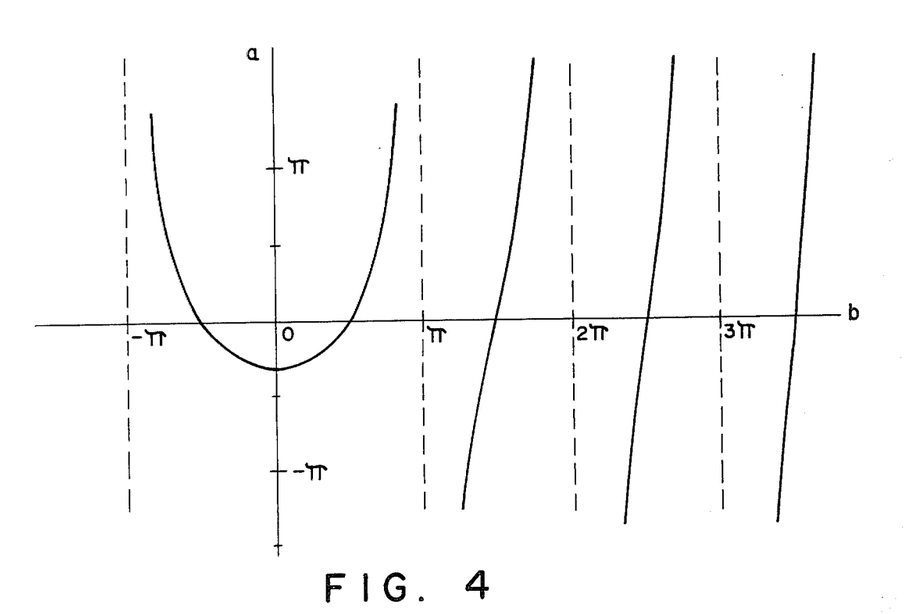
FIG. 4 is a graph showing the function a as a function of b.

The functions f(b) and $a = -b/\tan b$ are plotted in FIGS. 3 and 4, respectively. Combining the functions of FIGS. 3 and 4 yields f(b) as a function of a. This function is shown in FIG. 2. It can be seen that for every value of $k>0$, there are infinitely many solutions for a and b. Denoting these by $a_i$ and $b_i$, respectively, with $i = 3, 4 \ldots$, and taking $b_1 = b_2 = 0$, the complete solution of the problem is found to be $$C = \Sigma \frac{kR(a_i/\tau) + a_iL(a_i/\tau)/k}{\tau(l + a_i)} \exp \frac{a_i(t - \tau)}{\tau} \exp \frac{ib_i(t - \tau)}{\tau}$$

The exponentials in each term of this series represent the eigenfunctions of the closed loop system. Such exponentials are the product of an oscillating part $\exp[-jb_i(t-\tau)/\tau]$, and a decaying or growing part $\exp[a_i(t-\tau)/\tau]$. The growing part decays if $a_i<0$, and grows if $a_i>0$. It can be seen from FIG. 2 that all $a_i$ are less than zero if $k<\pi/2$. For $\pi/2<k<5\pi/2$, it can be seen that $a_3$ is positive, while all other $a_i$'s are still negative. Similarly, for $5\pi/2<k<9\pi/2$, both $a_3$ and $a_4$ are positive, and all other $a_i$'s are negative. In general, for $(2n+\frac{1}{2})\pi<k<[2(n+1)+\frac{1}{2}]\pi$, $n+1$ of the $a_i$'s are positive. The amplitude of each eigenfunction depends on the values of $\bar{R}(a_i/\tau)$ and $\bar{L}(a_i/\tau)$. These amplitudes do not influence the stability of the system.

The physical interpretation of the eigenfunctions is as follows. The "controlled system" delays the signal by a time $\tau$, and the sign of the signal is reversed in the comparator. The integrator delays the phase of a sinusoidal oscillation by $\frac{1}{4}T$, where T is the period of the oscillation. For such an oscillation, the sign reversal is equivalent to a phase delay of $\frac{1}{2}T$. It follows that there is a resonance whenever $\tau + 3T/4 = mT$, or $T = 4\tau/(4m-3)$, where $m = 1,2,3 \ldots$. The first eigenfunction occurs at $T = 4\tau$; its frequency is $W = 2\pi/T = \pi/2\tau$, and its growth rate is the product of the gain 1/K in the controlled system, and the gain $K_i/W$ is the controller:

loop gain $= (1/K)(K_i 2\tau/\pi) = 2K/\pi$.

It follows that the amplitude of this sinusoidal oscillation will grow if $k > \pi/2$. Similarly, the amplitude of the sinusoidal oscillation with $m=2$, period $T=4\pi/5$, will grow if the loop gain $(1/K)(K_i 2\tau/5\pi)$ is larger than unity, i.e. if $k > 5\pi/2$. Of course, the amplitude of the oscillation with $m=1$ will also grow in this case, at an even faster rate than the one with $m=2$.

The present invention includes a method to limit the magnitude of the oscillations occurring for $k > \pi/2$. As explained hereinafter in more detail, it has been found desirable to choose large values of k in order to obtain the best possible response time of the system. In addition, for a vehicle engine equipped with a three way catalyst, the remaining oscillations have been found to promote optimum preformance of the catalyst.

Figure 5:
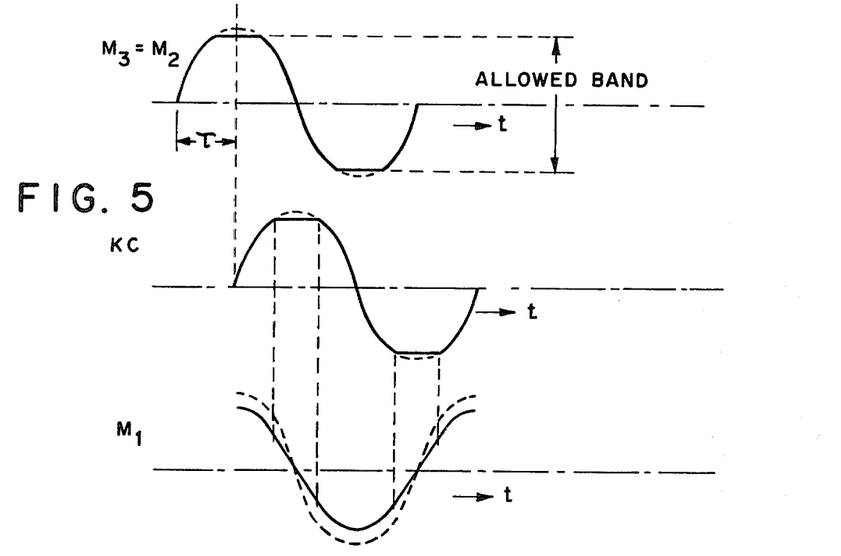
FIG. 5 is a graphic representation of the restriction of magnitude of oscillations.

The magnitude of the oscillations can be restricted by limiting the excursions of $M_2$. In the preferred embodiment of the invention, this is accomplished by allowing only a limited range over which a resistance can vary. The consequences of this can be analyzed by considering the case of a growing oscillation, at the time that its amplitude at $M_2$ just starts to exceed the limiting value. As shown in FIG. 5, the tops and bottoms of this signal then will be shaved off. If the load L equals zero, the signal C is identical in form to $M_2$, but is delayed by the time $\tau$. Integration of $-C$ now yields a straight line segment in the $M_1$ signal. The location of this segment is near the centerline, and its slope is less than that of the curved segment it replaces. As a consequence, there is a reduction in the amplitude of the signal at $M_1$, and hence at $M_2$. There results a signal that still looks very much like a sine function. The deviation from a sine function is small provided the growth rate is small, i.e., provided $a<<1$. The same result will occur for embodiments of the invention in which only the tops or only the bottoms of the signal are shaved off. The resulting signal in those embodiments will still resemble a sine function, but the centerline of this function will no longer coincide with the center of the allowed band of $M_2$.

The number of growing oscillations depends on the value of k. After the system is started up or disturbed, the eigenfunction with $n=3$ and $T=4\tau$ will have the fastest growth. Eventually, though, the eigenfunction with the largest value of n still having a positive growth rate will tend to dominate all the others. This eigenfunction has the highest frequency, and its fast oscillations between the limits do not permit any of the other oscillations to persist.

The response of the closed loop system of this invention to a step function in load is governed by the equation:

$$l = l_o H(t)$$

where H(t) is the Heaviside unit function: $H(t)=0$ for $t<0$, $H(t)=1$ for $t>0$. The step function appears at time $\tau$ in C, and gives rise to a signal $-l_o kt/\tau$ at $M_1$ during the time interval $\tau<t<2\tau$. The behavior of the signal at later times can best be determined by graphical methods. The response time is on the order of $\tau$ if $l_o$ is much smaller than the maximum amplitude of the signal at $M_2$, and if k is not much larger than $\pi/2$. Under such circumstances, the centerline of the oscillations at $M_2$ adjusts to compensate for the load $l_o$, and the amplitude of the oscillations is reduced correspondingly. A similar situation obtains when $l_o$ is close to the maximum amplitude at $M_2$. In other situations, for example when $l_o$ is on the order of one-half the maximum amplitude at $M_2$, or when k is large, the response pattern is quite different. Initially, the signal at $M_2$ will alternate between the limiting values, staying a finite amount of time at each of these values. The ratio of the times spent at each limiting value will be such that C will be zero, on the average. Eventually, the sinusoidal oscillations discussed above will take over. Their centerline will again be displaced to compensate for the load. If $l_o$ is larger than the maximum amplitude at $M_2$, the signal at $M_2$ will simply remain at its limiting value. In all of these cases, the response time as determined from the average value of C is on the order of the dead time $\tau$.

Figure 6:
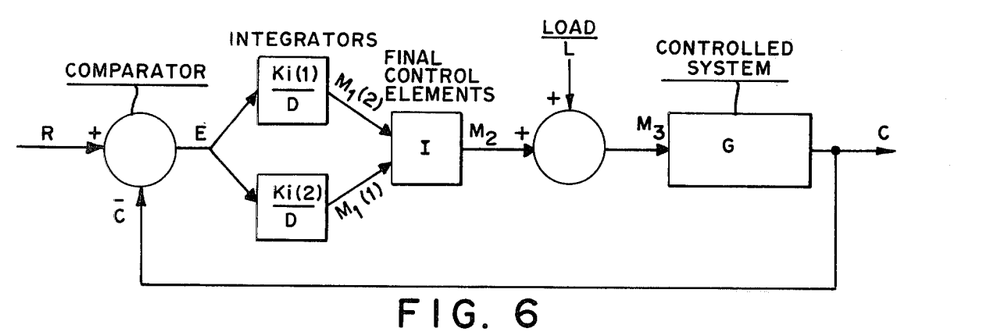
FIG. 6 is a block diagram of one embodiment of the present invention.

Referring to FIG. 6 of the drawings, there is shown a preferred plural loop control system of the invention. The control system incorporates two closed loops. A first of the two closed loops has a large gain, and is inherently unstable. The first loop compensates for short term disturbances, and has a relatively small authority over the controlled signal C. Operation of the first loop is analogous to that described above. The second loop compensates for long term disturbances. Its gain is small, so that it is inherently stable. The authority of the second loop over the controlled signal C is large, enabling it to compensate for large amplitude disturbances. The second loop will always tend to return the average value of C to zero. As a consequence, it will tend to bring the centerline of the oscillations of the first loop to the center of the band allowed for $M_2$.

Figure 7:
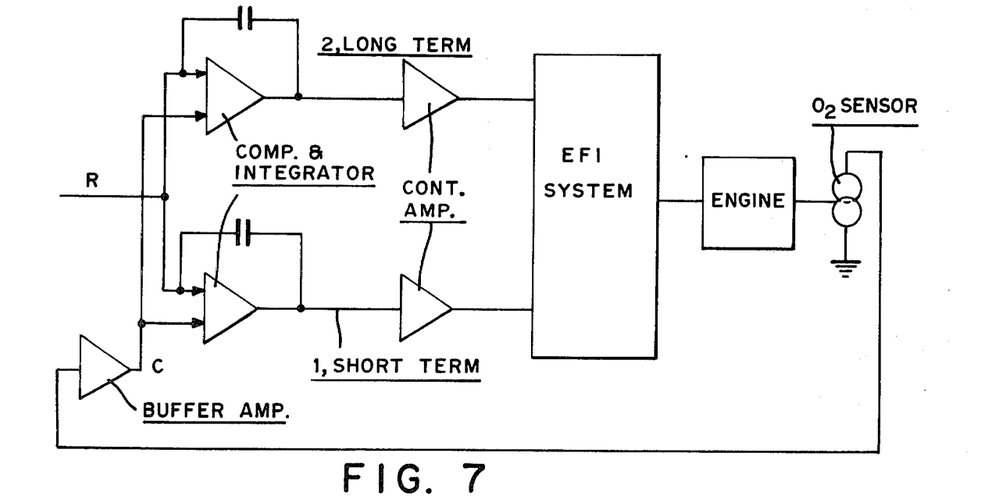
FIG. 7 is a schematic electrical diagram of the control loops shown in FIG. 6.

An electronic embodiment of the control loops of FIG. 6 is shown in FIG. 7. Integration of the first and second loops is accomplished by using an operational amplifier and a capacitor. A buffer amplifier between the oxygen sensor and the integrator, and continuous amplifiers between the integrator and the electronic fuel injection system, ensure satisfaction of impedance requirements.

Figure 8:
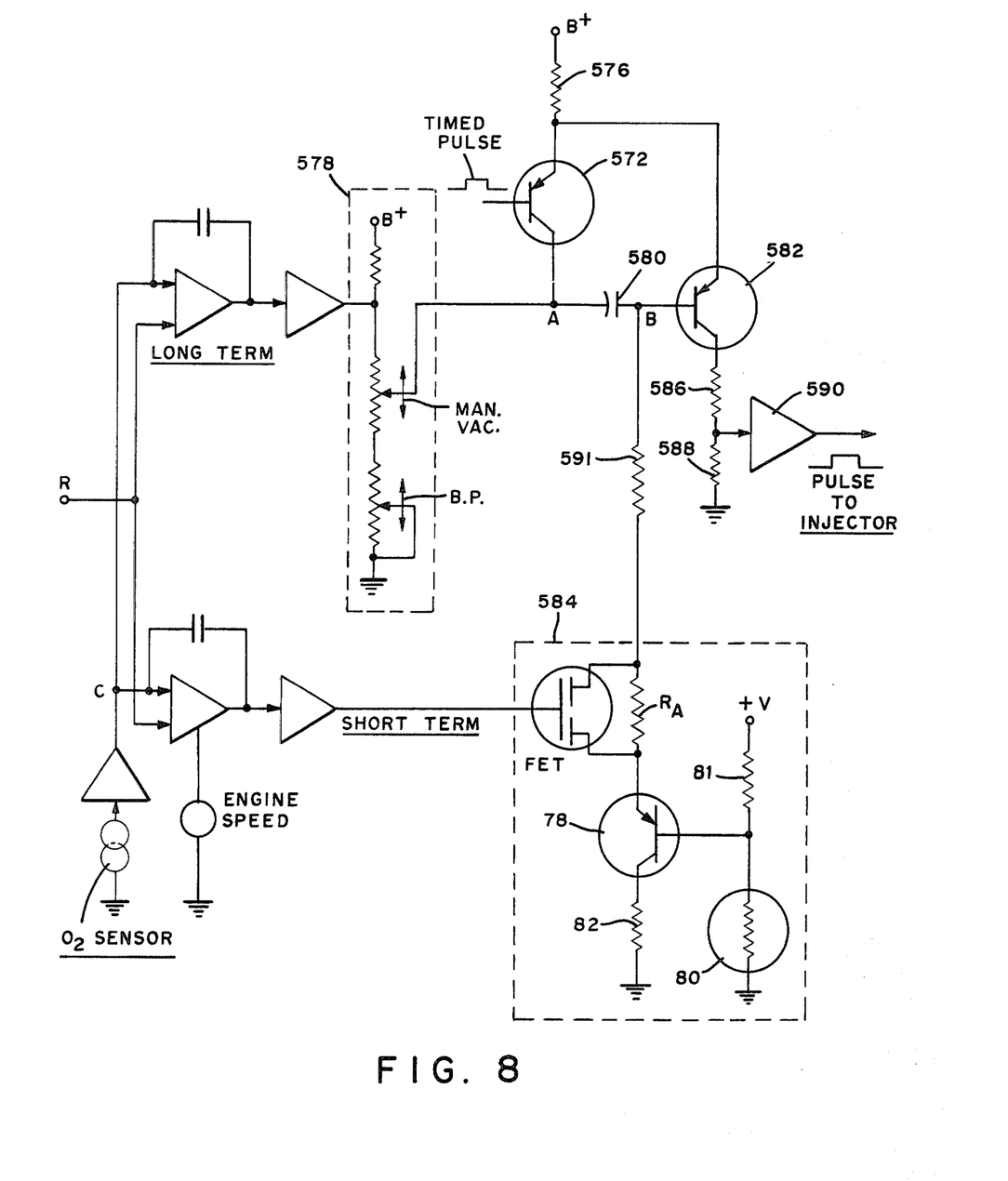
FIG. 8 is a circuit diagram showing the control loops of FIG. 6 is an electronic fuel injection system.

FIG. 8 shows a preferred way to combine the present invention with the fuel injection system described in my copending applications "Fuel Injection System", Ser. No. 629,421, and "Fuel Injection System With Warm-Up Circuit", Ser. No. 629,348, both filed Nov. 6, 1975. The basic function of the combined circuit is the generation of an electronic pulse which serves to open the fuel injectors for the correct amount of time. The start of the pulse coincides with the end of a "timed pulse" derived from a timing circuit. As in the two copending applications set forth above, the primary engine parameter determining the width of the pulse to the injectors is the intake manifold vacuum. Secondary parameters are barometric pressure, engine temperature, and idle and warm-up corrections. When combined with the closed loop circuitry of the present invention, these parameters still influence pulse width. However, the ultimate determination of pulse width now depends on air/fuel ratio as measured by the oxygen sensor. Except for the long term and short term loops shown in FIG. 8, the construction and operation of circuit components of the embodiment of FIG. 8 is essentially the same as that disclosed at pages 54–57 of copending application Ser. No. 629,348, which disclosure is hereby incorporated by reference.

Figure 9:
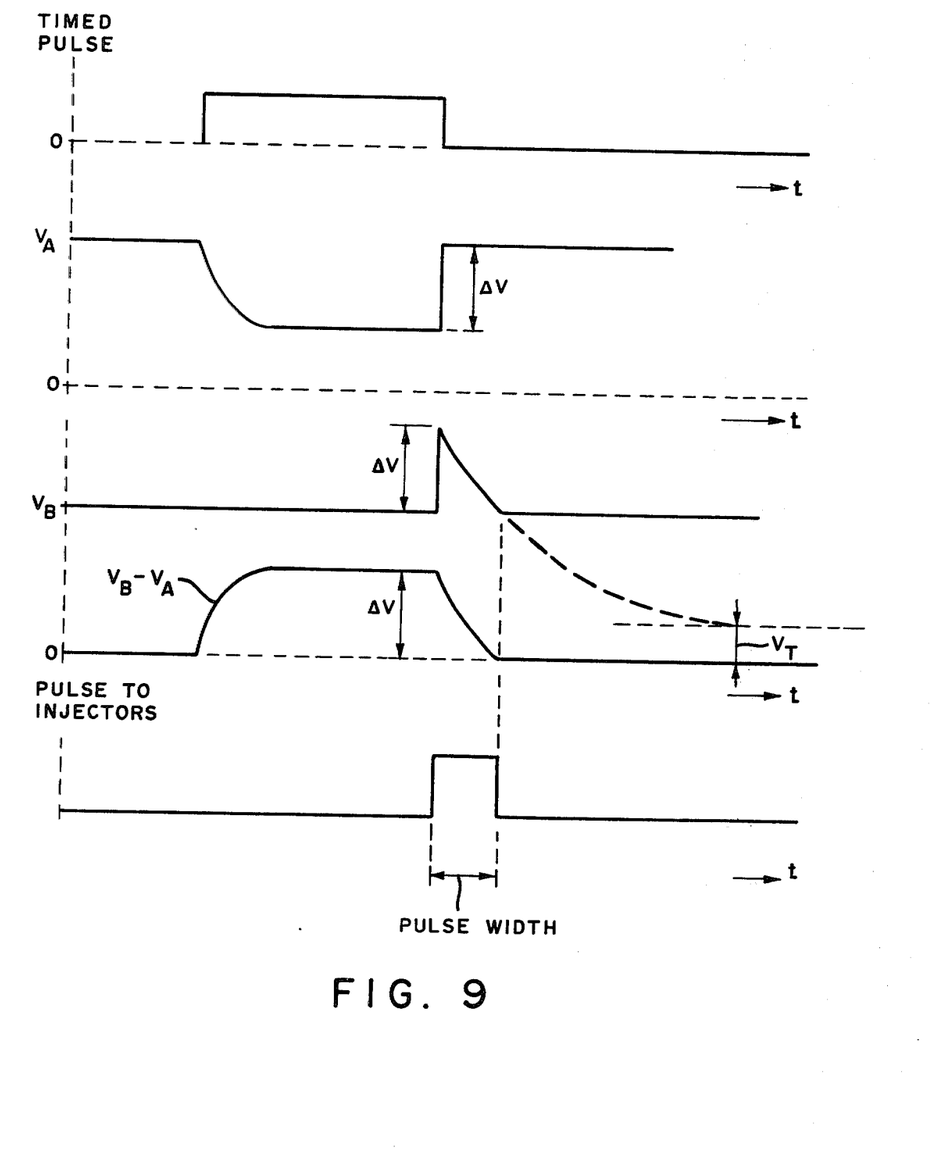
FIG. 9 is a series of graphs illustrating the operation of the circuit shown in FIG. 8.

The operation of the dual closed loop system is described hereinafter with reference to FIGS. 8 and 9. In the absence of the timed pulse (shown in FIG. 8) at the base of transistor 572, both transistors 572 and 582 are in the conductive state. As a consequence, there is no charge on the capacitor 580. The voltages $V_A$ and $V_B$ at the two sides A and B, respectively, of the capacitor are a fraction of the B+ voltage. This fraction depends on the resistances 576, 578, 586, 588, 591 and 584, as well as on the value of R-C as measured by the long term loop. Upon the arrival of a timed pulse at transistor 572, this transistor enters its non-conductive state. The voltage $V_B$ retains its value, but $V_A$ drops down to a value dependent on the intake manifold vacuum (MAN.VAC.), the barometric pressure (B.P.), and the value of R-C. This results in charging the capacitor 580 to a voltage $\Delta V$. Upon the removal of the timed pulse at transistor 572, this transistor returns to its conductive state. As a consequence, $V_A$ instantaneously returns to its previous value (as shown in FIG. 9). Because the voltage $\Delta V$ on the capacitor 580 cannot change instantaneously, the voltage $V_B$ increases by $\Delta V$. This causes transistor 582 to enter its non-conducting state, which initiates the pulse to the injectors. It also initiates a discharge of capacitor 580 through resistances 591 and 584. The character of this discharge is exponential, with the value of $V_B$ tending asymptotically to the voltage $V_T$ on the emitter of transistor 78. Voltage $V_T$ is determined by the voltage divider formed by resistor 81 and thermistor 80. The characteristic time of the discharge curve depends on the value of resistances 591 and 584, and hence on the value of R-C as measured by the short term loop. As soon as $V_B$ reaches the value of $V_A$, the transistor 582 returns to its conducting state. This terminates the pulse to the injectors, and restores the situation existing before the arrival of the timed pulse.

A formula for the pulse width can be derived as follows. While capacitor 580 is discharging, the voltage $V_B$ is given by $$V_B = (V_{Ao} + \Delta V) \exp(-t/R_e C_e).$$

Here, $V_{Ao}$ is the undisturbed value of $V_A$, $R_e$ is the effective value of the resistance through which the discharge takes place, and $C_e$ is the value of the capacitor 580. Equating $V_B$ to $V_{Ao}$ yields the pulse width:

$$\text{p.w.} = R_e C_e \ln(1 + \Delta V/V_{Ao}). \tag{8}$$

Although various less important effects have been omitted in the derivation of equation (8), the result illustrates that the pulse width depends on the values of $\Delta V$ and $R_e$.

The long term loop acts on the value of $\Delta V$, which is the charge on capacitor 580 at the beginning of the pulse to the injectors. The short term loop acts on the value of the effective resistance $R_e$ through which capacitor 580 discharges, and hence on the characteristic time of the discharge curve. The value of $\Delta V$ s also subject to manifold vacuum, barometric pressure, and idle and warm-up correction signals. However, the long term loop overrides all of these signals in a time substantially the same as its response time. The value of $R_e$ also depends on the values of resistors 591 and 82. Resistors 591 and 82 can be varied in response to changes in engine parameters other than those set forth above. The short term loop would nevertheless override all of these parameters in a time substantially equal to its response time.

The oxygen sensor is typically composed of zirconium oxide. At the high temperatures prevailing in the exhaust gas of a warm engine (about 1200° F.), the response time of the oxygen sensor is about one millisecond. The oxygen sensor is mounted at the neck of the exhaust manifold, where the exhaust gases of 4 cylinders of an 8-cylinder engine enter a common exhaust pipe. By mounting the fuel injectors near the intake parts of the cylinders, the time interval between formation of a fuel-air sample, the arrival of this sample at the oxygen sensor may be reduced to about one-half the time needed to complete one engine cycle. For example, when the engine is idling at 600 rpm, this time interval is about 50 ms. At an engine speed of 3000 rpm, the time interval is about 10 ms. These time intervals are about the same as the time interval between successive pulses to the four injectors serving the four cylinders. The width of the pulses to the injectors is about 2–10 ms, depending on engine load. The gain in the short term loop is such that the characteristic period of the oscillations is about ten milliseconds. The authority of the short term loop is about ±5% of the pulse width. For fluctuations in air/fuel ratio of about 0.05, the average output signal of the oxygen sensor is about 600 mV and the amplitude of the short term fluctuations is about ±30 mV. The maximum slope of the integrated sensor output appearing in the long term loop may be about 0.75 V/s. The average value of A/F is controlled to about ±0.03, when the engine is warm. In the event that the engine is cold, the effective response time of the sensor is somewhat longer (e.g. about 0.6–1.0 s at exhaust temperatures of about 900° F.). The resulting output of the sensor then consists of full scale excursions to the limits allowed by the short term loop. Typically, the time spent alternately at each of the limits may be on the order of a few hundred milliseconds.

In order to achieve maximum power output of the engine, the value of the air/fuel ratio should be on the rich side of stoichiometry. The maximum power engine output can be achieved by providing means for disabling the long term loop when the throttle valve is completely opened.

Having thus described the invention in rather full detail, it will be understood that these details need not be strictly adhered to but that various changes and modifications may suggest themselves to one skilled in the art, all falling within the scope of the present invention as defined by the subjoined claims.

I claim:

1. A closed loop fuel injection system for proportioning a mixture of air and fuel delivered to an internal combustion engine comprising:
    (a) sensor means for producing an electrical signal having a magnitude that varies in proportion to the concentration of exhaust gas from said engine;
    (b) first electrical circuit mean responsive to said electrical signal to compensate for small amplitude, short term disturbances in said electrical signal, said first circuit means having high gain, low stability and restrictive modification capability over said electrical signal, for providing a first circuit signal with an amplitude limited to a small value;
    (c) second electrical circuit means responsive to said electrical signal to compensate for large amplitude, long term disturbances in said electrical signal, said second circuit means having low gain, high stability, and large modification capability over said electrical signal for providing a second circuit signal with a large amplitude;
    (d) said first circuit means having a response time that varies directly with and is substantially the same as the time between formation and detection of said air fuel mixture, and being adapted to correct any part of said large amplitude disturbances that is not corrected by said second circuit means;
    (e) said second circuit means having a response time longer than the response time of said first circuit means, and being adapted to at least partially correct said large amplitude disturbances;
    (f) means for combining the first and second circuit signals to produce a composite pulse of variable width to fix the proportion of air-fuel in said mixture;
    (g) means for applying said composite pulse to an injector of said internal combustion engine;
    (h) wherein said means for combining includes a timing means connected to receive said circuit signals, means for enabling said timing means, said timing means being enabled in response to said enabling means and producing a timing signal having a time period responsive to said first and second circuit signals, said composite pulse of variable width produced by said means for combining, having a variable width responsive to said time period.

2. The system of claim 1 where the timing means is a resistance capacitor (RC) circuit, said capacitor of said RC circuit being charged to a first level responsive to said second circuit signal and discharging to a second level in response to said first circuit signal, said means for combining including a means having a threshold level and generating said pulse in response to said signal from said timing means discharging to said threshold level and said combining means producing said composite pulse having a variable width extending from the start of said timing period and ending responsive to the capacitor discharging to said threshold level.

3. The system of claim 2 wherein said timing means includes a varying means having an input connected to said second circuit signal, said resistance of said RC circuit being changed in response to said first circuit signal by said resistance varying means and where said timing period and the time for said capacitor to discharge to said threshold is responsive to said first circuit signal.

4. The system of claim 3 where said resistance varying means is a Field Effect Transistor (FET), said RC circuit includes a resistor connected in parallel with said FET and wherein said FET transistor reduces the resistance in said RC circuit in response to said first circuit signal.

* * * * *